(12) United States Patent
Dluzniak

(10) Patent No.: US 7,385,360 B2
(45) Date of Patent: Jun. 10, 2008

(54) HIGH INTENSITY DISCHARGE LAMP CONTROL

(75) Inventor: Richard Dluzniak, Victoria (AU)

(73) Assignee: The Active Reactor Company Pty Ltd., Kew, Victoria (AU)

( * ) Notice: Subject to any disclaimer, the term of this patent is extended or adjusted under 35 U.S.C. 154(b) by 30 days.

(21) Appl. No.: 11/228,702

(22) Filed: Sep. 15, 2005

(65) Prior Publication Data
US 2006/0071610 A1    Apr. 6, 2006

(30) Foreign Application Priority Data
May 8, 2003 (AU) .............................. 2003902210
May 7, 2004 (AU) ..................... PCT/AU04/00601

(51) Int. Cl.
*H05B 37/00* (2006.01)
(52) U.S. Cl. ................... 315/307; 315/219; 315/308; 315/DIG. 7
(58) Field of Classification Search ............... 315/307, 315/308, 224, 219, DIG. 7
See application file for complete search history.

(56) References Cited

U.S. PATENT DOCUMENTS

| | | | |
|---|---|---|---|
| 3,873,910 A | 3/1975 | Willis, Jr. | |
| 4,037,148 A | 7/1977 | Owens et al. | |
| 4,162,429 A | 7/1979 | Elms et al. | |
| 4,187,448 A | 2/1980 | Kuroi et al. | |
| 4,242,614 A | 12/1980 | Vatis et al. | |
| 4,394,603 A | 7/1983 | Widmayer | |
| 4,914,356 A * | 4/1990 | Cockram | 315/307 |
| 5,589,739 A | 12/1996 | Goossens | |
| 5,731,665 A | 3/1998 | Pruett | |
| 6,188,183 B1 | 2/2001 | Greenwood et al. | |

FOREIGN PATENT DOCUMENTS

| | | |
|---|---|---|
| JP | 7 154013 | 6/1995 |
| WO | WO 90/09729 | 8/1990 |
| WO | WO 1997/029618 | 8/1997 |

* cited by examiner

*Primary Examiner*—David H. Vu
(74) *Attorney, Agent, or Firm*—Inskeep IP Group, Inc.

(57) ABSTRACT

A controller 5 for a high intensity discharge lamp 4 includes a primary ballast for providing a primary current to the lamp 4, and a current injector which in the case shown comprises a control ballast 8 and a switch 9 (e.g. a triac) controlled by a control unit 12. The current injector injects a secondary current into the lamp 4 that is less than the primary current and can be varied by the control unit 12, e.g. by varying the amount of time within an a.c. cycle that the control ballast 8 is switched into the circuit. The controller 5 allows the lamp 4 to be controlled, for example, to operate at a constant power (variable light output) or at a constant light output (variable power).

32 Claims, 6 Drawing Sheets

HIGH INTENSITY DISCHARGE LAMP CONTROL

RELATED APPLICATIONS

This invention is related to and claims priority from Australian Patent Application No. 2003902210, filed May 8, 2003, entitled High Intensity Discharge Lamp Control; and PCT Application No. PCT/AU2004/000601, filed May 7, 2004, entitled High Intensity Discharge Lamp Control, which are incorporated herein by reference.

FIELD OF THE INVENTION

The present invention broadly relates to controllers and circuits for controlling the operation of high intensity discharge lamps. It also broadly relates to methods of controlling the operation of high intensity discharge lamps.

BACKGROUND

High intensity discharge (HID) lamps include high pressure sodium lamps, metal halide lamps and mercury vapour lamps. They are distinct from for example fluorescent lamps. For example, they tend to operate under higher pressures and temperatures, they emit visible light directly (although they may also include some phosphor coatings), and they are generally compact light sources having arc tubes with small electrode spacings. They tend to have relatively high power ratings, for example above 150 Watts.

Gas discharge lamps in general require some form of regulation element to allow for their start-up and operation. There are a number of different controllers on the market for fluorescent lamps, but less so for HID lamps.

Generally, a HID lamp system will use an inductive ballast that is designed to make the lamp operate at its approximate design power assuming a constant supply voltage. In practical installations, however, the input supply voltage can change due to supply line disturbances and the like, and this can result in a lamp being over-driven or under-driven. Other factors can also affect the proper running of a lamp, such as changes caused by lamp aging, by differences between lamps due to manufacturing tolerances, and by environmental conditions.

If a lamp is over-driven, it can exhibit adverse characteristics such as overheating, reduction in lamp life, electrode damage, reduced efficiency and low colour temperature. Conversely, if a lamp is under-driven, adverse characteristics of low light output, reduced efficiency, high colour temperature and arc tube blackening tend to result.

An aim of the present invention is to provide new and advantageous controllers, circuits and methods for controlling the operation of HID lamps.

SUMMARY OF THE INVENTION

Viewed from one aspect, the present invention provides a controller for a high intensity discharge lamp, the controller including a circuit having:

a primary ballast for electrical connection between a power supply and the lamp, the primary ballast being configured to provide a primary current to said lamp;

a current injector for injecting a secondary current to said lamp, said secondary current being lower than said primary current, and said injector including a control unit for varying the amount of said secondary current, said control unit being configured to monitor one or more parameters associated with said lamp and/or said power supply and to vary the amount of secondary current supplied based upon said monitored parameter or parameters.

The present invention utilises a fixed primary ballast that can provide a main lamp current that is not under active control, whilst also employing a variable smaller injected current to alter the overall lamp current based on feedback relating to the lamp and power supply conditions.

The present invention enables an appropriate control of the lamp based on changes in the lamp characteristics or variations in the power supply, whilst at the same time using control electronics that need be rated only to the smaller injected current, and so allows for the use of small and inexpensive components. The present invention therefore provides a practical intelligent controller for a HID lamp, that can monitor the lamp and power supply conditions and can modify the lamp power to enhance the operation of the lamp, e.g. to provide a stable power operation and/or a stable light output.

Preferably, the control unit monitors the current flowing through the lamp, and alters the secondary current accordingly. This can allow the controller to compensate for example for changes in the power supply, so that the lamp can be run at a stable power irrespective of variations in e.g. the power supply voltage.

Further preferably, the control unit monitors the voltage across the lamp, and determines a desired lamp current based on this voltage. The control unit can then supply a suitable secondary current to the lamp. By monitoring lamp voltage, the controller can compensate for changes in the characteristics of the lamp over time. For example, the control unit may vary the lamp current so that the lamp operates at a constant power, or may operate the lamp current to provide a desired current profile. In the latter case, for example, lamp current may be increased over the length of a lamp's life so as to maintain an appropriate light output (which otherwise might drop due to changes in the lamp, e.g. due to loss of discharge material).

The present invention can therefore in one embodiment provide a current injection means with a current and voltage sensing means to create an intelligent system that can provide overall control of the lamp power under various power supply and lamp conditions. Maintaining the lamp at a substantially constant power level assists in ensuring that the lamp is not under or over driven and that the life of the lamp is increased, whilst maintaining the light output of the lamp over a longer time helps to increase the efficiency with which the lamp can be used, e.g. it does not need to be run for over-illumination at the start of its life so as to maintain a high enough light output at the end of its life.

The current injection means may be operated to inject current into the circuit at any suitable point within the circuit. In one form, the current injection means operates to inject current into the circuit at a point between the primary ballast and the lamp.

The current injection means may take any suitable form. It could for example take the form of a switched-mode power supply. In one form, the current injection means includes a passive current limiter (e.g. a resistor or capacitor but preferably a control ballast) and a switch (e.g. a triac) to switch the control ballast between an active position and an inactive position where, in the active position, the control ballast injects current into the lamp.

The current injector may be provided with a separate power source from the primary ballast, e.g. of about 100 volts. In one preferred embodiment, however, the current injector is connected to the same power source as the primary ballast. In this case, for example, the control ballast may be placed in a parallel-type arrangement with the primary ballast, although this will generally only be in a transient manner, and for only a part of the duration of a cycle of the power supply, during the time when the switch is in an active position.

The control unit preferably monitors the voltage across the ballast so as to provide a synchronisation signal for the input of the secondary current.

The control ballast may have any suitable impedance and rating. Preferably, the control ballast has an impedance that is greater than an impedance of the primary control ballast.

When operating the lamp at a steady power, the ratio of the volt-amp power rating of the control ballast to the primary ballast may be between approximately 0.2 and 0.4, e.g. 0.3, and the control ballast may have an impedance that is approximately 1.2 times the impedance of the primary ballast. The primary current to secondary current ratio at nominal supply voltage may be in the range of 2.5 to 8.0, e.g. 4.0. Thus, for example, the primary current may be about four times that of the secondary.

Generally, when attempting to compensate for variations in the power supply, the lamp current at the nominal supply voltage needs to be made up of a component of both the primary current and the secondary current, without the secondary current being zero. This is because the secondary current cannot be negative, and so there must already be a component of the secondary current at the nominal supply voltage, so that when the supply voltage increases, the secondary current can be reduced to compensate.

When operating the lamp to run at a steady light output over a long period of time, the secondary current may be controlled to increase the lamp power over time to compensate for loss of efficacy of the lamp, efficacy being light output per unit of input power. The primary ballast and current injector may be configured such that at maximum secondary current, e.g. at the end of the lamp life, the ratio of primary current to secondary current is between about 2.0 and 9.0, and is preferably about 3.0. In one embodiment, the ratio of the impedance of the primary ballast to the secondary ballast may be e.g. between about 0.7 to 0.9, preferably about 0.8.

Generally, the current injection means injects variable amounts of current into the circuit by controlling the amount of time for which the control ballast is switched into the main circuit, and the current injection means operates for only part of each cycle. Preferably, the current injection means operates as a transient phenomenon. The current injection means may, for example, operate to inject current into the circuit at two injections per cycle. It may also additionally or alternatively operate to inject a maximum absolute value of current into the circuit at 90° and 270° per cycle. In another form, the current injection means operates to inject current into the circuit at 100 injections per second when the power supply frequency is 50 Hz. When using a switched-mode power supply, a further control switch could be provided as with a control ballast, or the switched-mode supply itself could be suitably controlled based on the lamp current and voltage, and in this case, the secondary current may be provided for the full a.c. cycle of the primary current.

In a still further form of the invention, the circuit includes a transformer, e.g. a step-up transformer, which injects voltage into the circuit to facilitate starting of the lamp. This may, for example, inject 50v into the circuit to aid in the starting of the lamp. This is particularly helpful in starting old lamps.

As another aid to starting, the control unit may be configured to operate at a high, e.g. maximum, secondary current at start-up, irrespective of lamp current and voltage, so as to aid in the starting of the lamp. The control unit may for example run at a high secondary current for about the first 100 cycles of the power supply at start-up.

In a further embodiment, the control unit may include a dimming feature. Thus, the control unit may include a timer or a manual switch or the like, so that at a desired time, the lamp can be run at under the usual light output requirements by reducing the amount of secondary current, e.g. to zero.

The present invention also extends to lighting systems and lamp apparatus including a controller in accordance with the above, and to methods for providing lamp control using such controllers.

Viewed from another aspect, the present invention provides a high intensity discharge lamp controller, the controller including: a primary ballast for electrical connection between a power supply and the lamp, the primary ballast being configured to provide a primary current to said lamp; a current injector for injecting a secondary current to said lamp, said secondary current being lower than said primary current and being variable.

Viewed from a further aspect, the present invention provides a method of controlling the lighting of a high intensity discharge lamp, the method including the steps of providing a primary ballast to supply a primary current to the lamp from a power source, providing a current injector for supplying a secondary current to said lamp that is smaller than said primary current, and varying the amount of the secondary current so as to control the total lamp current.

Thus, the invention can be seen in this aspect to provide an intelligent power supply by using a smaller secondary current that can be controlled.

Viewed from another aspect, the present invention provides a circuit for controlling operation of a high intensity discharge lamp, the circuit including:

(a) a primary ballast electrically connected between a power supply and the lamp;

(b) current injection means for injecting current into the circuit;

(c) current sensing means for measuring current flowing through the lamp; and (d) voltage sensing means for measuring the voltage across the lamp;

wherein the current injection means operates to inject current into the circuit based on a measurement from both of the current sensing means and the voltage sensing means to control the power of the lamp.

In a further aspect of the invention, there is provided a method of controlling the operation of a high intensity discharge lamp, the method including the steps of:

(a) measuring the current flowing through the lamp;

(b) measuring the voltage across the lamp; and (c) injecting current into the lamp;

wherein the current is injected into the lamp based on a measurement of current flowing through the lamp and the voltage across the lamp.

In another aspect of the invention, there is provided a magnetic regulator for a high intensity discharge lamp, including:

(a) a primary ballast being electrically connected between a power supply and the lamp;

(b) current injection means for injecting current into the lamp;

(c) current sensing means for measuring current flowing through the lamp;

(d) voltage sensing means for measuring voltage across the lamp;

wherein the current injection means operates to inject current into the lamp based on a measurement from both of the current and voltage sensing means to control the power of the lamp;

In a further aspect, there is provided a control unit for a high intensity discharge lamp, the lamp being electrically connected in series to a primary ballast, the control unit including:

(a) current injection means for injecting current into the lamp;

(b) current sensing means for measuring current flowing through the lamp; and (c) voltage sensing means for measuring voltage across the lamp;

wherein the current injection means operates to inject current into the lamp based on a measurement from both of the current sensing means and voltage sensing means to control the power of the lamp.

In another aspect, there is provided a control unit for a high intensity discharge lamp, the control unit including:

(a) a primary ballast electrically connected between a power supply and the lamp;

(b) current injection means for injecting current into the lamp;

(c) current sensing means for measuring current flowing through the lamp; and (d) voltage sensing means for measuring voltage across the lamp;

wherein the current injection means operates to inject current into the lamp based on a measurement from both of the current sensing means and voltage sensing means to control the power of the lamp.

In a further aspect, there is provided a circuit for controlling a high intensity discharge lamp, the circuit including:

(a) a primary ballast electrically connected between a voltage source and the lamp;

(b) a secondary ballast;

(c) current sensing means for measuring current flowing through the lamp;

(d) voltage sensing means for measuring voltage across the lamp; and (e) a control unit for switching the secondary ballast in and out of the circuit depending on the measurement from the current and voltage sensing means.

It is to be understood that the optional features described in relation to the first aspect of the invention are also equally applicable to each of the other aspects described.

BRIEF DESCRIPTION OF THE DRAWINGS

Embodiments of the present invention will hereinafter be described by reference to the attached drawings, which illustrate example forms of the present invention. It is to be understood that the particularity of the drawings does not supersede the generality of the preceding description of the invention. In the drawings.

DETAILED DESCRIPTION

Figure 1:
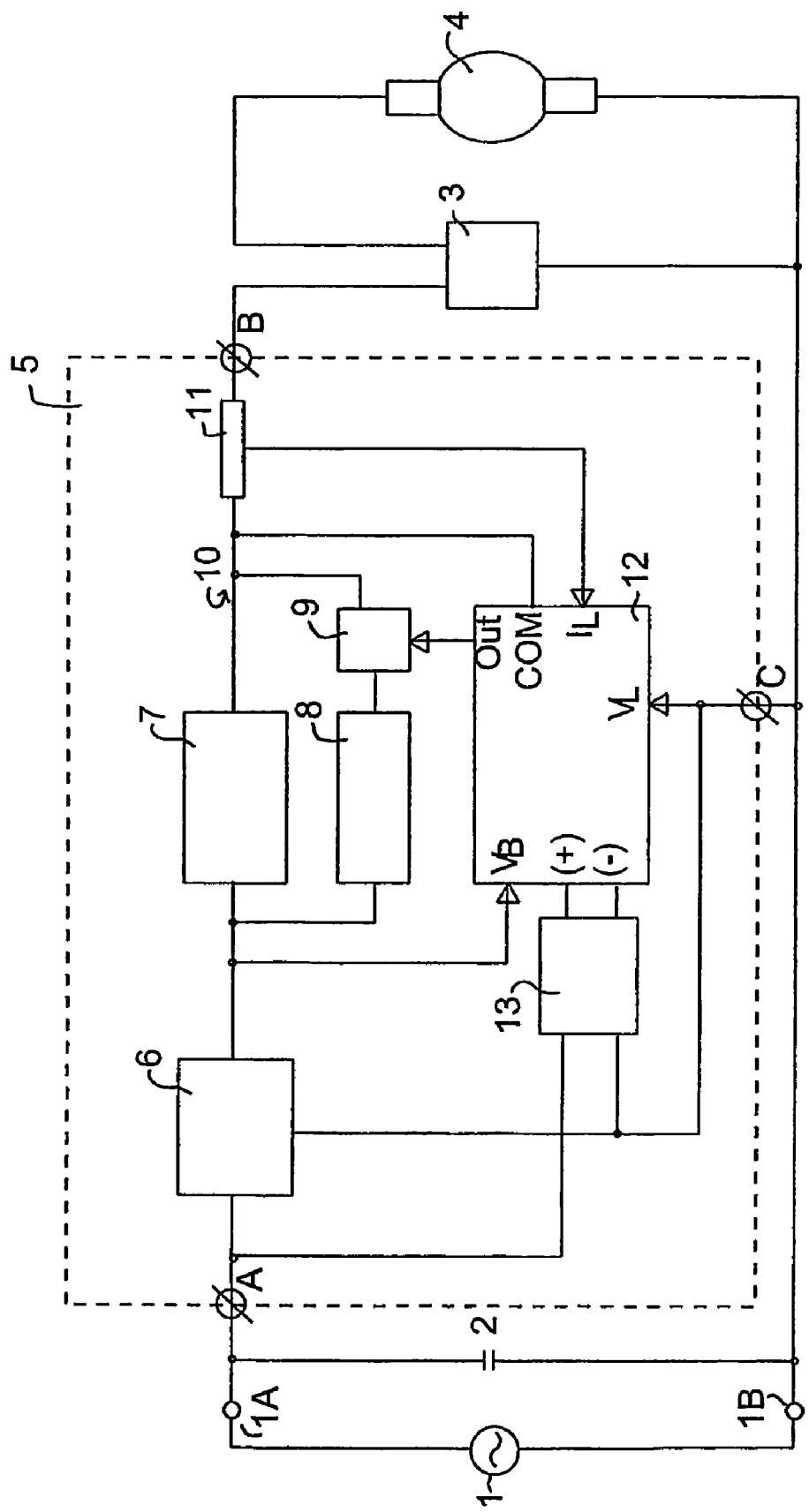
FIG. 1 is a schematic block diagram showing the arrangement of a controller and components to operate a lamp in accordance with one embodiment of the present invention.

Referring to FIG. 1, this shows a schematic block diagram of the arrangement of components of a lighting system configured according to one embodiment of the present invention.

The circuit includes an a.c. power source 1, having terminals 1A and 1B, connected to a lamp controller 5 which is placed in circuit with an ignitor 3 and an HID lamp 4. The ignitor 3 may be any conventional ignitor that is suitable for the initial starting of an HID lamp, preferably the ignitor 3 is an electronic ignitor. The lamp 4 may be any suitable HID lamp. Although any suitable HID lamp may be controlled by the present invention, the invention is particularly suitable for controlling high pressure sodium, metal halide or mercury vapour discharge lamps, and for controlling lamps with a power rating between about 150 watts and about 2000 watts, e.g. lamps rated at greater than or equal to about 250 watts, 400 watts, or 1000 watts. The circuit also includes a power factor correction capacitor 2 connected across the terminals 1A and 1B. The controller 5 can be used with new lamps, or it can be retrofitted to existing lamps.

The controller 5 shown in this embodiment of the present invention is a three terminal device having terminals at points A, B, and C. The controller 5 includes a transformer 6 being a step-up transformer that acts to inject voltage into the lamp circuit to facilitate lamp starting. The transformer 6 is connected in series with the lamp circuit and injects approximately 50 volts AC into the circuit and subsequently into the lamp. This aids in starting of the lamp, particularly as it ages.

The transformer 6 is electrically connected to a primary ballast 7, the primary ballast 7 is in this instance an inductor and is used as the primary current limiting and voltage drop element for the lamp. A control ballast 8 and an electronic switch (e.g. a triac) 9 are placed in parallel with the primary ballast 7 as a current injector.

When the switch 9 is in a closed position, the control ballast 8 is in a parallel-type relation with the primary ballast 7 in a transient fashion, e.g. only for a portion of the duration of a cycle of the a.c. supply. This configuration operates to inject current flowing through the control ballast 8 into node 10. A switch control unit 12 controls the switch 9 to inject the additional current into the main circuit at the appropriate time and for the appropriate duration. A current sensor 11 is provided downstream of node 10 to provide current signals for the switch control unit 12. The switch control unit 12 controls the operation of the electronic switch 9 thereby regulating the injection of current into node 10 and subsequently into the lamp 4. The control unit 12 performs the logical functions and timing to control the operation of the lamp 4. The inputs into the control unit 12 are the lamp voltage ($V_L$), ballast voltage ($V_B$) and lamp current ($I_L$). The output from the control unit 12 is a signal to the electronic control switch 9. The control unit 12 is operated by a power supply 13 that may nominally be a 5 V DC regulated power supply.

The control unit 12 may be provided for example as either an electronic or microprocessor component.

Figure 2:
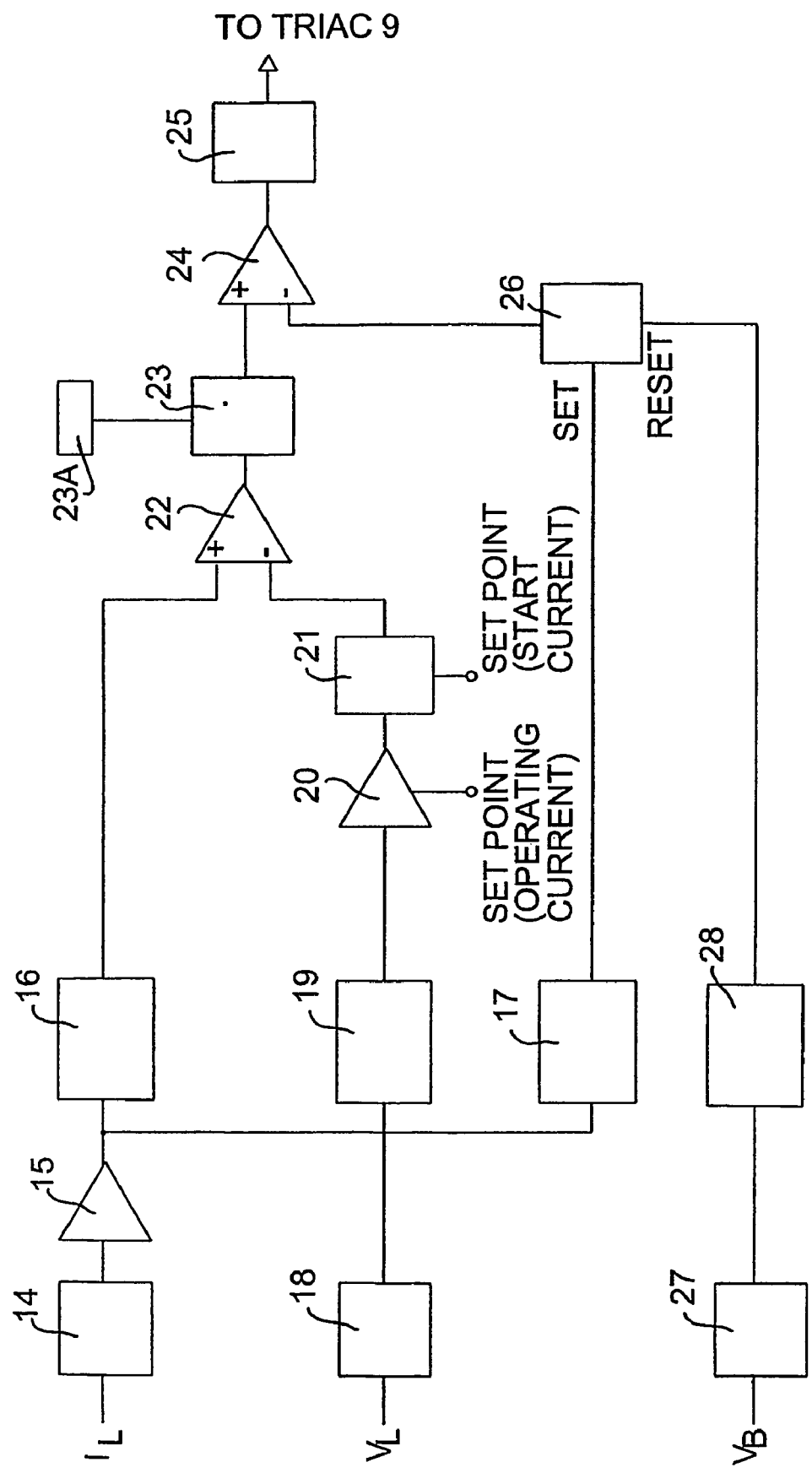
FIG. 2 is a schematic block diagram of an electronic switch control unit that may be used in the controller of FIG. 1.

An operation of an electronic version of the switch control unit 12 for operating the lamp is schematically illustrated in FIG. 2. The control unit 12 includes a full wave rectifier 14 and amplifier 15 which produces a rectified version of the lamp current ($I_L$). This signal is then fed to an averaging filter 16 which averages the rectified lamp current and produces a DC signal which is proportional to the lamp current ($I_L$). A full wave. rectifier 18 receives the lamp voltage ($V_L$) and processes this to produce a rectified version which is then passed to an averaging filter 19 which averages the rectified lamp voltage to produce a DC signal which is proportional to the lamp voltage ($V_L$). This signal is then fed to a non-linear amplifier 20 that appropriately synthesizes the volt-amp characteristics of the lamp thereby generating the required current signal for the particular lamp voltage, i.e. it determines a desired lamp current based upon the actual lamp voltage, e.g. to provide a constant lamp power. This signal is processed by the start current set point amplifier 21. The signal from a start current set point amplifier 21 is then passed to a first comparator 22 which compares the actual lamp current from the averaging filter 16 with the set point value. The comparator 22 produces a logic high or low which is ramped up or down by an integrator 23 (which operates with an integrator initialization circuit 23A) to produce a slowly varying DC signal which represents the magnitude of the additional current required by the lamp 4, which can be provided by switching in the control ballast 8.

A ramp generator 26 generates a triangular waveform that is initiated by the current ($I_L$) zero crossing and reset by the ballast voltage ($V_B$) zero crossing. The current and ballast voltage zero crossings are obtained from respective zero crossing detectors 17 and 28. The input to detector 28 is obtained from the full wave rectifier 27 which uses the ballast voltage as its input and the input to the detector 17 is obtained from the rectified version of the lamp current output by the rectifier and amplifier 14 and 15. The output of the ramp generator 26 represents the phase of the current required by the lamp, and provides a synchronisation signal for the activation of the switch 9.

The outputs from the integrator 23 and the ramp generator 26 are fed to a second comparator 24 which generates a variable phase shifted square wave, which is processed by a pulse generator 25 to produce a gate firing pulse for the triac 9 shown in FIG. 1.

Figure 3:
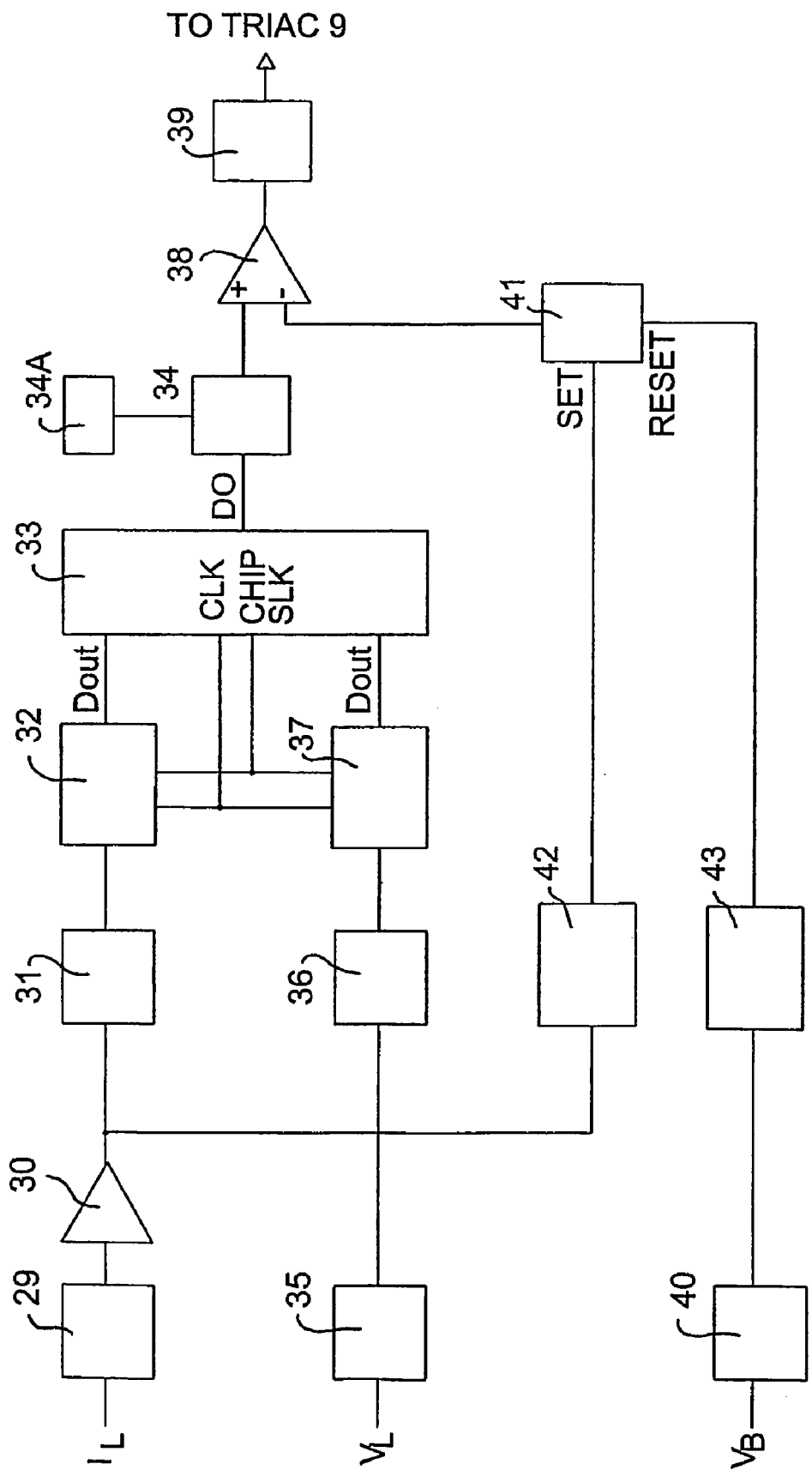
FIG. 3 is a schematic block diagram of a microprocessor switch control unit that may be used in the controller of FIG. 1.

A microprocessor version of the switch control unit 12 for operating the lamp is schematically illustrated in FIG. 3. The control unit 12 receives a signal of the lamp current ($I_L$) and passes this signal to a full wave rectifier 29 and amplifier 30 to produce a rectified version of the lamp current. This signal is passed to a sample and hold circuit 31 to capture the lamp current and then than Analog to Digital Converter (ADC) 32 that converts the lamp current into an 8 bit digital number. The converted 8 bit current number is then passed to a microprocessor 33. The ADC 32 runs at a frequency of 2 kHz.

The other input to the microprocessor 33 is the lamp voltage signal ($V_L$) which is passed through a full wave rectifier 35 to produce a rectified version of the lamp voltage. The signal is then passed to a sample and hold circuit 36 and to an analog to digital converter 37 to convert the lamp voltage into an 8 bit digital number. This converted 8-bit voltage number is then passed to the microprocessor 33. The ADC 37 runs at a frequency of 2 kHz.

The microprocessor multiplies the 8 bit current and voltage numbers to obtain the instantaneous power in the lamp and generates the sum of these products to obtain the power per cycle in the lamp. The power is then compared with a reference (set point) power of the lamp, i.e. the desired power value that it is desired to operate the lamp at. A digital one or zero is then generated and out-putted by the microprocessor depending on the difference between the actual and set point lamp powers.

One particularly suitable microprocessor is an 8-bit microprocessor containing a stored program to control the data acquisition and conversion, to perform power calculations and to generate the required digital output. The output from the microprocessor 33 is passed to an integrator 34 (which operates with an integrator initialization circuit 34A) to ramp up or down the digital input from the microprocessor and generate a slowly varying DC signal which represents the magnitude of the current required by the lamp. A ramp generator 41 generates a triangular waveform that is initiated by the current zero crossing and reset by the ballast voltage zero crossing. The current and ballast voltage zero crossings are obtained from their respective zero crossing detectors 42 and 43, which receive their inputs from the full wave rectifier and amplifier 29,30 of the lamp current and the full wave rectifier 40 of the ballast voltage. The output of the ramp generator 41 represents the phase of the current required by the lamp, and provides a synchronisation signal for the actuation of the switch 9.

The outputs from the integrator 34 and the ramp generator 41 are fed to a second comparator 38 which generates a variable phase shifted square wave that is processed by a pulse generator 39 to produce a gate firing pulse for the triac 9 shown in FIG. 1.

Figure 4:
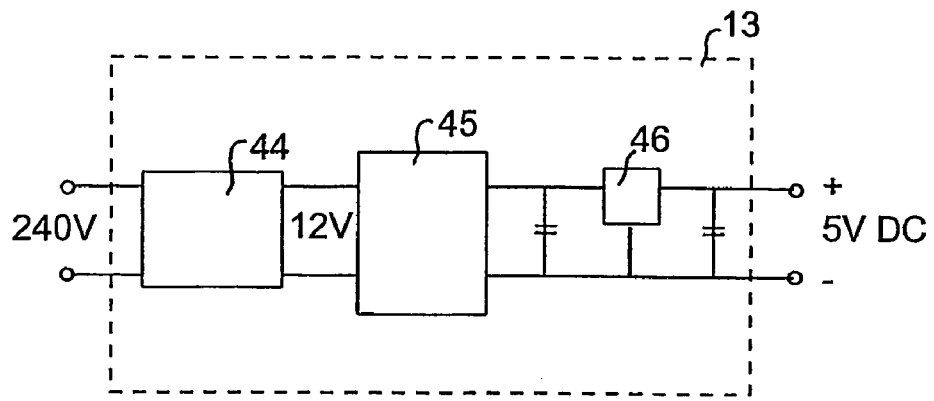
FIG. 4 is a schematic block diagram of a power source that can be utilised to operate a switch control unit.

FIG. 4 is a circuit diagram of a power supply 13 suitable for operating the switch control unit 12. The power supply 13 includes a 240/12 V step down transformer 44, the output of which is connected to a full wave diode bridge rectifier

45. A voltage regulator 46 is electrically connected to the rectifier 45 and generates a 5-volt DC regulated voltage which can be utilised to power the control unit.

Figure 5:
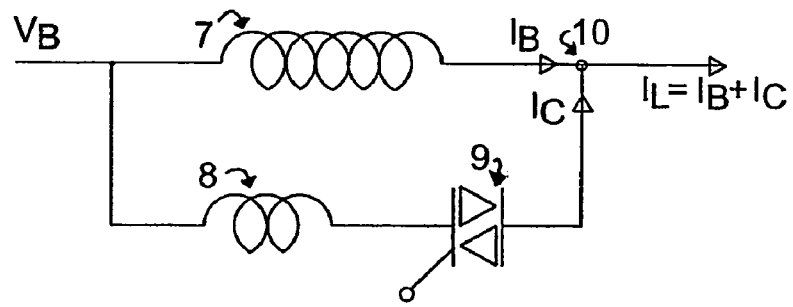
FIG. 5 is a schematic diagram further illustrating components of a circuit arranged to operate a lamp.

FIG. 5 is a circuit diagram illustrating the basic components and principles of a controller according to an aspect of the present invention. The circuit shown includes the primary ballast 7 having a current $I_B$ passing therethrough. The control ballast 8 is connected with the primary ballast through the triac switch 9, to inject a control current into the main ballast circuit, so as to provide control to the lamp current. The triac switch 9 receives a control signal, e.g. from the control unit 12 of FIG. 2 or 3, to operate the switch. In an active position where current $I_C$ is injected into node 10, the triac switch 9 is closed and the control ballast 8 is placed in circuit with the primary ballast. The additional current injected into the circuit $I_C$ is added to the current passing through the primary ballast $I_B$ to provide the lamp current $I_L = I_B + I_C$. When the triac switch 9 is open, the lamp current $I_L$ is simply the current flowing through the primary ballast $I_B$. The control ballast 8, switch 9 and control unit 12 described and illustrated can be considered as the injection means, providing for an injection of current $I_C$ into the circuit for the duration of time for which the triac switch 9 is closed per cycle. This injection of current via the current injection means can be seen as a transient phenomena, which can be contrasted to a steady state phenomena where the control ballast is simply placed in parallel with the primary ballast for the whole of the cycle thereby merely changing the impedance of the primary ballast. Thus, the control ballast 8 is only connected with the primary ballast for a part of the duration of a full cycle of the a.c. power supply 1, the amount of control current being input depending on the length of time during a cycle that the switch 9 remains closed.

Thus, a primary ballast provides a main fixed current for the lamp (assuming a stable power source), and an additional smaller current is injected as a control current to compensate for variations in the supply power and lamp characteristics. This enables the total lamp current to be varied through the use of inexpensive electronic components that need only be rated for the smaller control current, so that a practical and cost-effective HID lamp controller can be provided.

The monitoring of the lamp current allows the controller to maintain a desired current in to the lamp irrespective of supply current variations, whilst the monitoring of the lamp voltage allows the controller to set a desired current based on a desired lamp running condition, e.g. it can vary the lamp current to ensure that the lamp runs at a constant power. The change in lamp voltage can arise e.g. through changes in the characteristics of the lamp tube that occur with time. The embodiment can also deal with variations between lamps caused by tolerance effects and the like. Monitoring of the primary ballast voltage can help to synchronise the input of the control current.

FIGS. 6 to 9 illustrate operation of the circuit shown in FIG. 5 for three values of supply voltage, these being (a) 240 V-10%, (b) 240 V (nominal) and (c) 240 V+10%.

Figure 6A:
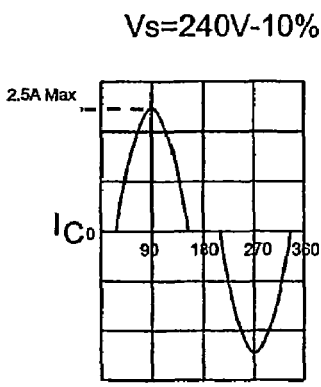
FIGS. 6a and 6b are graphs showing the secondary current (injected current) and the primary current flowing in a secondary (control) ballast and in a primary ballast respectively for a power supply voltage of 240V-10%.
Figure 6B:
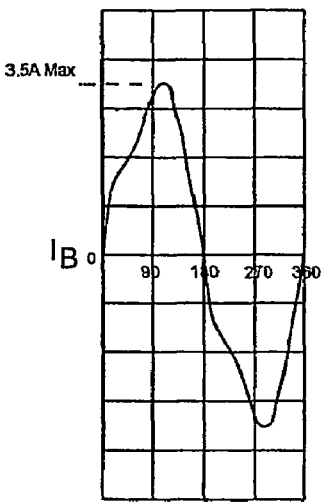
Figure 9:
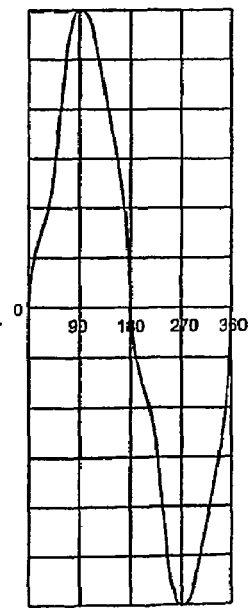
FIG. 9 is a graph showing the resultant current flowing through the lamp for each of the FIG. 6 to FIG. 8 situations (the current being substantially constant for the various power supply voltage variations shown)

FIGS. 6*a* and 6*b* are respective graphs of control ballast current $I_L$ and primary ballast current $I_B$ for a 240 V-10% voltage. The maximum absolute value of $I_C$=2.5 A is injected at 90° and 270°. The maximum absolute value of $I_B$=3.5 A occurs at 90° and 270°. These values are added at node 10 to provide a maximum absolute lamp current ($I_L$) of 6.0 A at 90° and 270°. The resulting current through the lamp ($I_L$) is shown in FIG. 9.

Figure 7A:
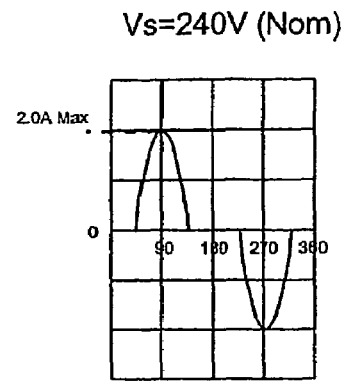
FIGS. 7a and 7b are graphs showing the secondary current (injected current) and the primary current flowing in a secondary (control) ballast and in a primary ballast respectively for a power supply voltage of 240V.
Figure 7B:
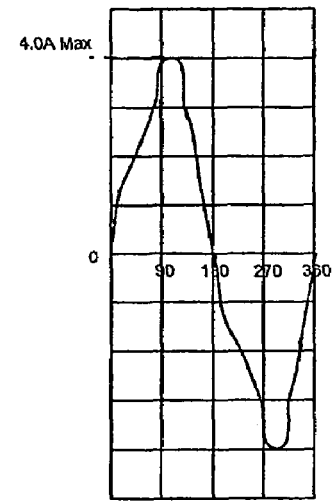

FIGS. 7*a* and 7*b* are respective graphs of control ballast current $I_L$ and primary ballast current $I_B$ for a 240 V (nominal) voltage. The maximum absolute value of $I_C$=2.0 A is injected at 90° and 270°. The maximum absolute value of $I_B$=4.0 A occurs at 90° and 270°. These values are added at node 10 to provide a maximum absolute lamp current ($I_L$) of 6.0 A at 90° and 270°. The resulting current through the lamp ($I_L$) is also shown in FIG. 9.

Figure 8A:
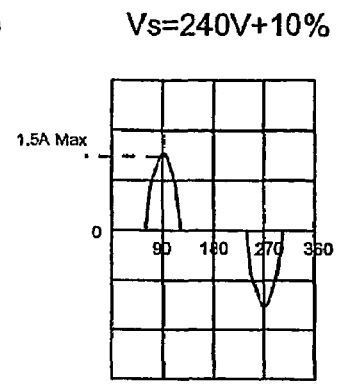
FIGS. 8a and 8b are graphs showing the secondary current (injected current) and the primary current flowing in a secondary (control) ballast and in a primary ballast respectively for a power supply voltage of 240V+10%.
Figure 8B:
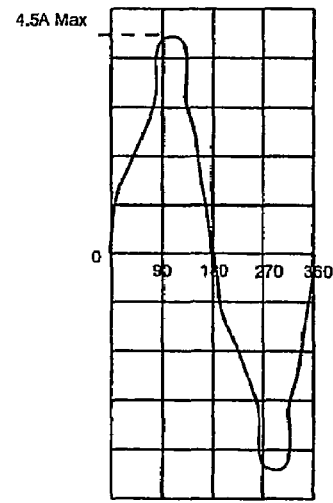

FIGS. 8*a* and 8*b* are graphs which respectively show the control ballast current $I_L$ and primary ballast current $I_B$ for a 240 V+10% voltage. The maximum absolute value of $I_C$=1.5 A is injected at 90° and 270°. The maximum absolute value of $I_B$=4.5 A also occurs at 90° and 270°. The resulting current though the lamp ($I_L$) is also shown in FIG. 9.

The lamp current ($I_L$) is approximately constant for all of the three voltage variations which corresponds to approximately constant power in the lamp.

In the above embodiment, the lamp current ($I_L$) and lamp voltage ($V_L$) are measured, and the control ballast current is adjusted to ensure that the lamp power is kept constant. The current in the primary ballast is not controlled and will change due to supply voltage variations, aging of the lamp and other factors and disturbances. To compensate for these effects, the control ballast is switched into the circuit for precisely the right amount of time per cycle to inject the correct amount of current into the lamp to keep the power in the lamp constant.

The ratings and impedance ratios of the primary and control ballasts are important in operation of the circuit. In one preferred embodiment, the power rating of the control ballast is approximately between about 0.2 to about 0.4, and is preferably about 0.3, of the rating of the main ballast. In another preferred embodiment, the impedance of the control ballast is approximately 1.2 times the impedance of the primary ballast.

For the control ballast, the maximum current in the ballast (100% duty cycle) occurs for the minimum supply voltage or minimum lamp voltage. The minimum current in the control ballast (0% duty cycle) occurs for the maximum supply voltage or maximum lamp voltage. Therefore, the control ballast should be rated based on the expected variations.

For the primary ballast, the maximum current in the primary ballast occurs for the maximum supply voltage or minimum lamp voltage. The minimum current in the primary ballast occurs for the minimum supply voltage or the maximum lamp voltage.

The primary ballast should be set to provide a current that is lower than the desired nominal lamp current, so that the control ballast applies an additional current at the nominal power supply voltage. This ensures that increases in the supply voltage above the nominal value can be compensated for by a reduction in the control current.

Experimental results for a 400 watt metal halide lamp show that for a supply voltage variation of ±10%, the lamp current variation is approximately ±0.5%, the lamp voltage variation is approximately ±1.5% and the lamp power variation is ± approximately 2.5%. In this example, at a constant supply voltage, the lamp draws 3.5 amps comprising a primary ballast current of 2.5 amps and a control ballast current of about 1 amp, with the maximum control current being about 2 amps.

Another method of operating the controller 5 of any of the above embodiments is now described with reference to FIGS. 10 to 14, in which the controller compensates for a reduction in the efficacy of the lamp over its life so as to maintain a constant lumen output, rather than the constant lamp power described in relation to the above embodiments.

As shown in FIG. 10, the controller again includes a primary ballast 70 and a current injector 80 that together supply current to the lamp 4. The blocks 70 and 80 show the current profiles in this embodiment for the primary and secondary currents.

Figure 11:
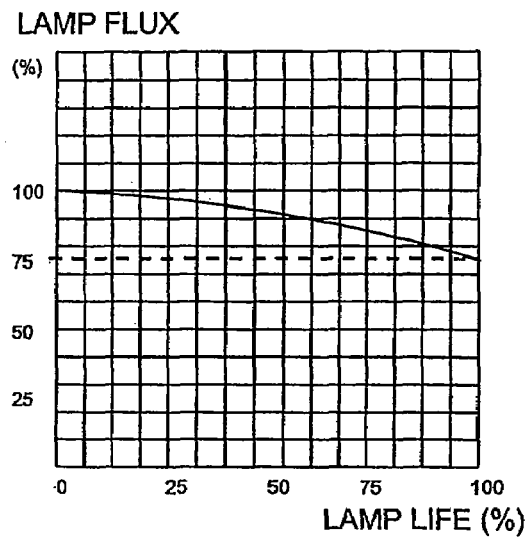
FIG. 11 is a graph of lumen characteristics for a typical HID lamp.

During the lifetime of a HID lamp 4, the amount of light output by the lamp for a set lamp power operation (the efficacy) reduces over time. This is caused by changes in the characteristics of the lamp 4 itself, e.g. diffusion of the gases out of the lamp arc tube over time and the like. This situation is shown in FIG. 11, in which lamp efficacy is reduced by 25% by the end of the lamp's lifetime.

Figure 12:
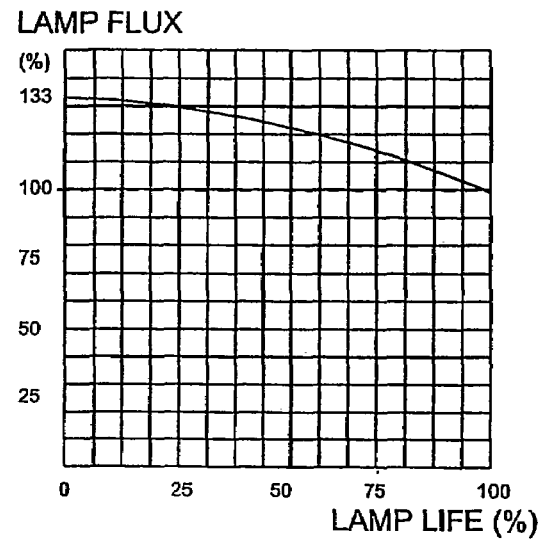
FIG. 12 is a graph of lumen characteristics for a typical HID lamp showing how a lamp is operated to ensure a set (maintained) lighting level.

In order to overcome this problem, it has been the norm to design lighting systems so as to provide over-illumination at the start of the lamp's life, so that at replacement, the lamp will be operating at the required level of lighting (the "maintained" lighting level). Thus, as shown in FIG. 12, a lighting system will be designed so that the lamp will be run at the start of its life to provide 133% of the required (maintained) light output, so that at the end of its life, it will be outputting at least the maintained amount of light.

This lighting regime has implications as to energy usage and results in wastage in the electricity needed to provide the excess lighting, and also in the accompanying reduction in lamp life that this lighting regime causes.

In accordance with this embodiment of the present invention, however, the control current injected by the current injector 80, e.g. a control ballast 8 and switch 9 controlled by a control unit 12, is controlled so that the lamp power is increased over time to compensate for the drop in efficacy. Thus, the primary ballast 70 is configured to provide a primary current for operating the lamp 4, which is set to about the power necessary for a new lamp to output the actual (maintained) amount of light required by the lighting designer. Then, as the lamp ages, the control unit 12 increases the power over time by adding more control current through the ballast 8. In order to provide stability against e.g. power variations and the like, as in the first embodiment, the primary current may be set so that a suitable amount of control current is required at the start of the lamp's life also, i.e. the primary ballast is configured to provide a primary current that is less than the current required for running the lamp at the desired power at the nominal supply voltage.

In order to determine the amount of control current to inject over time, the current injector 80 monitors the lamp supply voltage, which is indicative of the age of the lamp. The actual relationship between the lamp voltage and the lamp's efficacy can be obtained for most lamps from the lamp manufacturer. The current injector is configured so as to provide the appropriate current based on the monitored voltage. This can be done for example in the FIG. 2 embodiment of the controller 2 by appropriate design of the non-linear amplifier 20, or in the embodiment of FIG. 3 by the provision of look-up tables in memory associated with the microprocessor 33.

Figure 13:
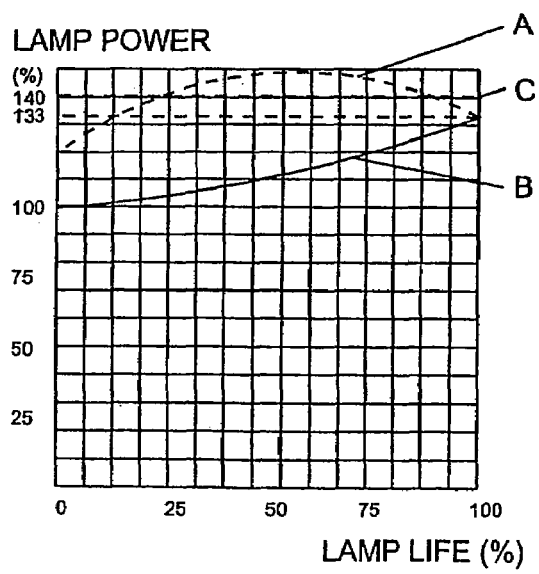
FIG. 13 is a graph of lamp power characteristics for a typical HID lamp operated in accordance with a standard ballast and in accordance with a controller according to an embodiment of the present invention.
Figure 14:
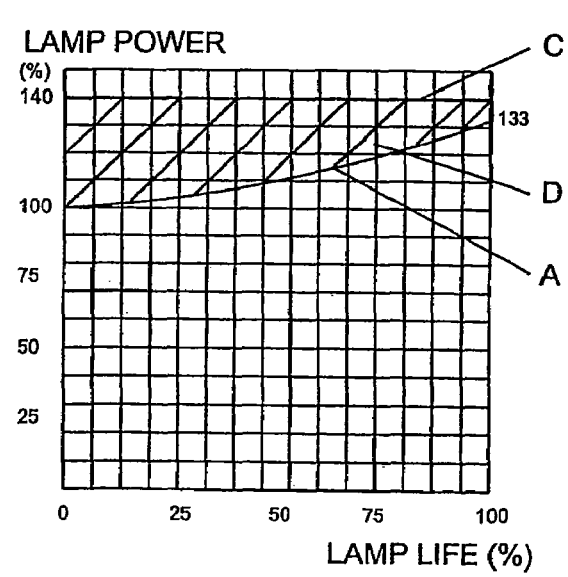
FIG. 14 is a similar graph to FIG. 13 showing energy savings associated with a controller according to an embodiment of the present invention.

FIG. 13 shows the lamp power versus life time for an HID lamp controlled with a standard ballast A, and for the same HID lamp controlled with a controller in accordance with the present embodiment B.

As can be seen, without any power stability control, the lamp power A for the standard ballast varies in a somewhat complex manner, but is designed to provide an average lamp power that is about 140% of the power needed by a new lamp to meet the desired lighting needs.

In contrast, the lamp power B for the present controller shows a stable and steady ramping up of the lamp power, so that at all times the desired lighting needs are met without requiring excess lighting. As shown in FIG. 13, this provides a considerable power saving. Savings can be increased still further, when it is realised that the life of the lamp can also be increased due to the stable and minimum power running of the lamp.

The ratio of primary current to maximum secondary current, i.e. at the end of the lamp's life, may be for example between about 2.0 to 9.0, with 3.0 being a preferred ratio. At the end of a lamp's life, for example, the primary current may provide 70% of the lamp current, and the secondary current may provide 30% of the lamp current. Such ratios provide a good balance for a high primary current that is not controllable and a lower secondary current that can be controlled by suitably inexpensive components.

The impedance ratio of the primary ballast and a control ballast of the current injector may be e.g. between about 0.7 and about 0.9, preferably about 0.8.

Figure 10:
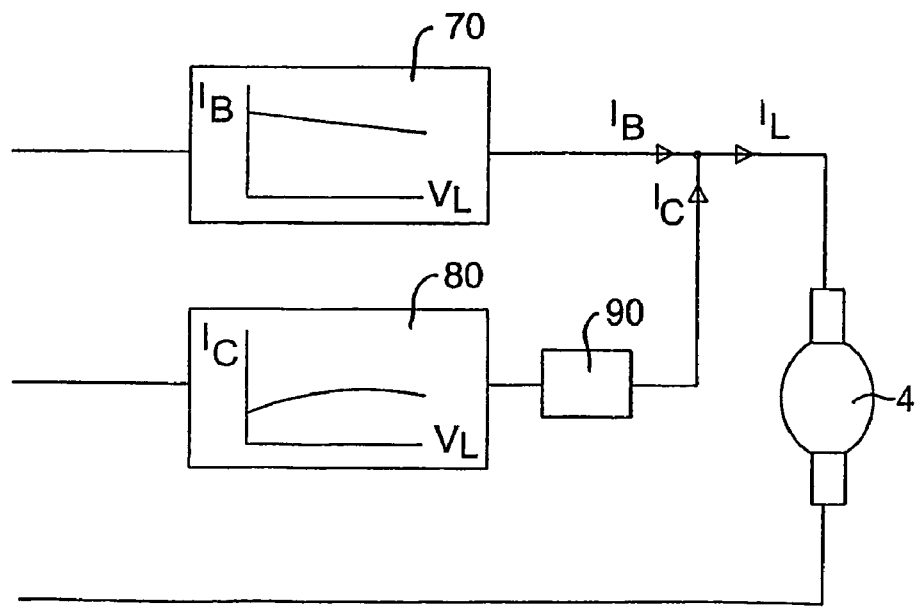
FIG. 10 is a schematic diagram showing a further embodiment of the present invention.

The embodiment of FIG. 10 also shows two further differences over e.g. the embodiments of FIGS. 1 to 5, which could also be provided to those embodiments. Thus, the current injector 80 does not necessarily have to receive its power supply from the same source as the primary ballast 70, and may have its own dedicated supply.

Also, the control current may be further modified, e.g. by a switch 90, so as to for example turn off the control current, and so provide a dimmer function. Alternatively, the current injector itself, e.g. through the control unit 12 could be configured to provide a dimming function, where it provides a reduced current output that departs from a normal light output. The dimmer control could be a manual control or e.g. a timed control, so as to dim the lighting on command or at set time periods.

All of the above embodiments provide good control of a lamp through the use of a current injector operating a lower current that is controllable and operates at a lower current than the main current. This allows the lamp input current to be varied, and allows the controllers to control the lamp current to a constant value or to a desired profile which may for example provide the above efficacy compensation, but could also provide other profiles.

Variations on the above embodiments are also possible, it would also be possible to use a different current injection circuit. For example, as said, the current injector, e.g. ballast 8 and switch 9 may receive their input power from a separate source to that of the primary ballast 7. Also, a switched-mode power supply could replace the control ballast 8 (and possibly switch 9), and e.g. could provide the current injector 80 of FIG. 10. In this case, the supplemental current may be on throughout the whole cycle of the main a.c. supply, but providing a lower or higher r.m.s current as necessary.

In any of the above embodiments, the current injector may be run high, e.g. at maximum, at start-up of the lamp, e.g. for the first 100 cycles or so of the main a.c. current, so as to help in starting of the lamp. This would be irrespective of the lamp voltage or current at that time.

The present lamp lighting system can be used in many different situations, e.g. in street lighting, sports lighting and industrial, e.g. warehouse and factory, lighting.

It is to be understood that various alterations, additions and/or modifications may be made to the parts previously described without departing from the ambit of the present invention, and that, in the light of the above teachings, the present invention may be implemented in a variety of manners as would be understood by the skilled person.

What is claimed is:

1. A controller for a high intensity discharge lamp, the controller including a circuit having:
   a primary ballast for electrical connection between a power supply and the lamp, the primary ballast being configured to provide a primary current to said lamp;
   a current injector for injecting a secondary current to said lamp, said secondary current being lower than said primary current, and said injector including a control unit for varying the amount of said secondary current, said control unit being configured to monitor one or more parameters associated with said lamp and/or power supply and to vary the amount of secondary current supplied based upon said monitored parameter or parameters.

2. The controller of claim 1, wherein said control unit monitors the current flowing through said lamp.

3. The controller of claim 1, wherein said control unit monitors the voltage across said lamp, and determines a desired lamp current based on said voltage.

4. The controller of claim 1, wherein the control unit monitors the voltage across the primary ballast to synchronise the secondary current with the primary current.

5. The controller of claim 1, wherein the current injector injects current at a point between the primary ballast and the lamp.

6. The controller of claim 1, wherein said current injector includes a separate power source for providing the secondary current.

7. The controller of claim 1, wherein said current injector is connected to the same power source as the primary ballast.

8. The controller of claim 1, wherein the current injector includes a switched-mode power supply circuit.

9. The controller of claim 1, wherein the current injector includes a passive current limiter and a switch, and said control unit activates the switch to control the amount of current injected.

10. The controller of claim 1, wherein the current injector includes a secondary ballast and a switch, and said control unit activates the switch to control the amount of current injected.

11. The controller of claim 9, wherein said switch is a triac.

12. The controller of claim 1, wherein the current injector has an impedance that is greater than the impedance of the primary ballast.

13. The controller of claim 1, wherein said control unit controls the amount of secondary current such that the lamp is operated at substantially constant power.

14. The controller of claim 13, wherein said primary ballast is configured to provide a primary current that is X% of the required lamp current at the nominal power supply input voltage, and the current injector provides 100-X% of the required lamp current at the nominal power supply input voltage, where X is about twice the expected variation in the nominal power supply voltage.

15. The controller of claim 13, wherein said primary ballast and current injector are configured to provide a primary current and a secondary current in a ratio of about 7:3 to 9:1, and preferably 8:2.

16. The controller of claim 13, wherein current injector includes a secondary ballast having an impedance that is about 1.2 times the impedance of the primary ballast.

17. The controller of claim 13, wherein the current injector includes a secondary ballast and wherein the ratio of the volt-amp rating of the secondary ballast to the primary ballast is between about 0.2 to about 0.4, and is preferably 0.3.

18. The controller of claim 1, wherein the control unit is configured to provide a predetermined lamp current to lamp voltage profile.

19. The controller of claim 1, wherein the control unit is configured to provide an increasing lamp current over time, so as to compensate for a reduction in efficacy of the lamp with time.

20. The controller of claim 1, wherein the control unit is configured to monitor lamp voltage and to adjust lamp current based on lamp voltage, such that the increase in lamp power compensates for a reduction in efficacy of the lamp with time.

21. The controller of claim 18, wherein said primary ballast and current injector are configured such that at maximum secondary current, the ratio of primary current to secondary current is between about 2.0 to about 9.0, and is preferably 3.0.

22. The controller of claim 17, wherein the current injector includes a secondary ballast, and wherein the ratio of the impedance of said primary ballast to said secondary ballast is about between about 0.7 and about 0.9, and is preferably about 0.8.

23. The controller of claim 1, wherein said control unit includes a dimmer control for reducing the amount of secondary current, such that the lamp is operated at a lower power than during normal operation.

24. The controller of claim 1, wherein the control unit is configured such that at start-up of the lamp, e.g. for about the first 100 cycles of the power supply, the secondary current is set to a high current irrespective of the parameters monitored.

25. The controller of claim 1, wherein the controller is configured to supply power to a high pressure sodium lamp, a metal halide lamp or a mercury vapour lamp.

26. The controller of claim 1, including a transformer for injecting voltage into the lamp for facilitating lamp start-up.

27. The controller of claim 1, wherein the current injector operates to inject current as a transient phenomena.

28. The controller of claim 1, wherein the current injector operates for only a part of an AC power supply cycle.

29. The controller of claim 1, wherein the current injector operates to inject current into the circuit at two injections per cycle.

30. The controller of claim 29, wherein the current injector operates to inject a maximum absolute value of current into the circuit at approximately 90° and approximately 270° of said cycle.

31. The controller of claim 1, wherein the control unit controls the amount of secondary current input into the lamp by controlling the amount of time that the current injector injects current into the primary circuit.

32. A lighting system including a HID lamp and a controller according to claim 1.

* * * * *